July 9, 1974  C. R. JONES  3,823,065
APPARATUS FOR SELECTIVELY TRANSPORTING FUEL ELEMENTS
Filed Sept. 7, 1971  7 Sheets-Sheet 4
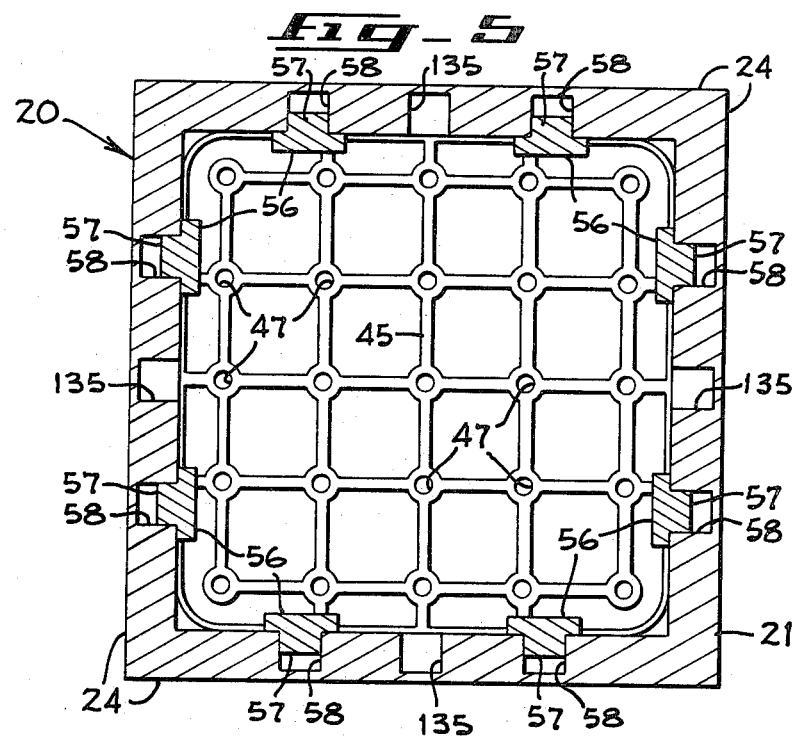
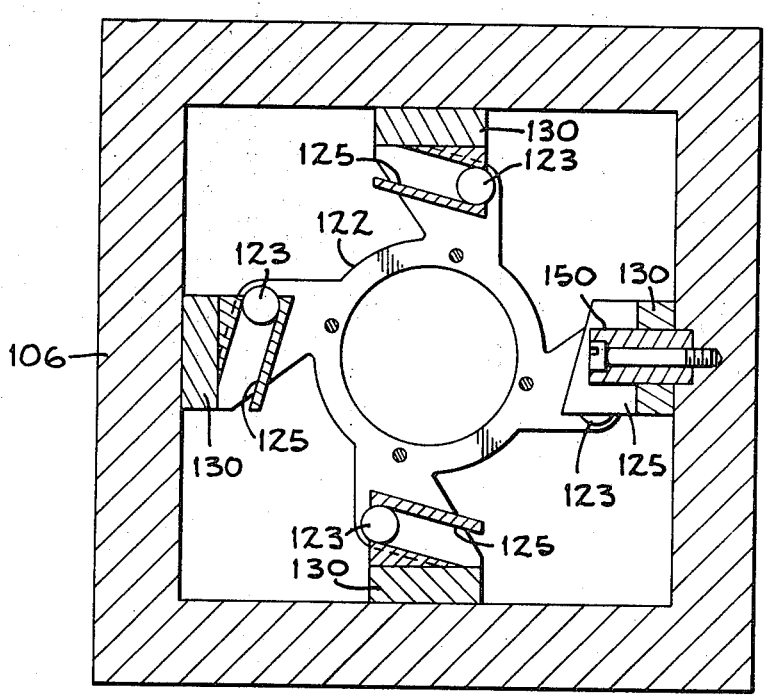
INVENTOR.
CECIL R. JONES
BY Jack M. Weseman
ATTY.

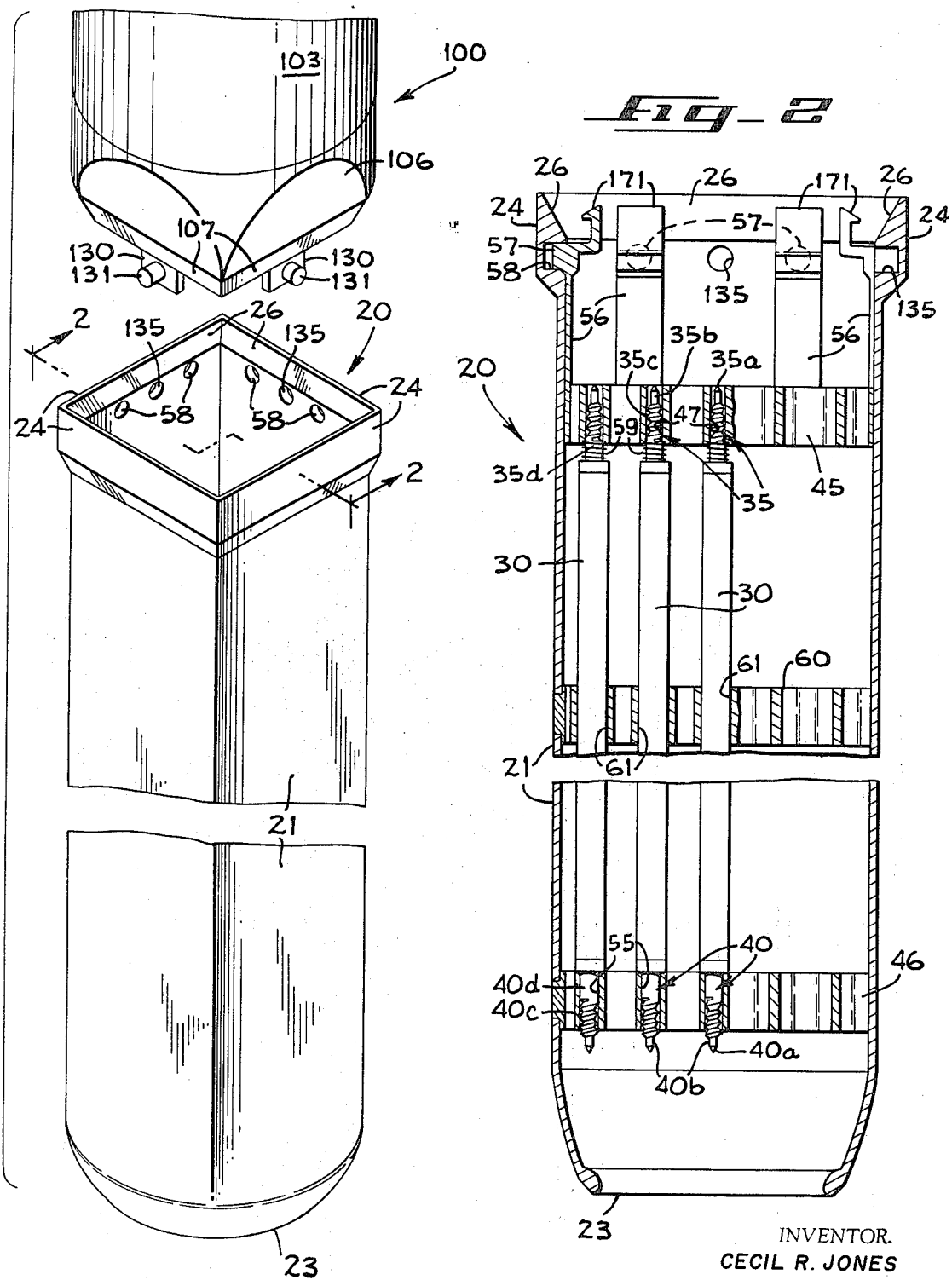

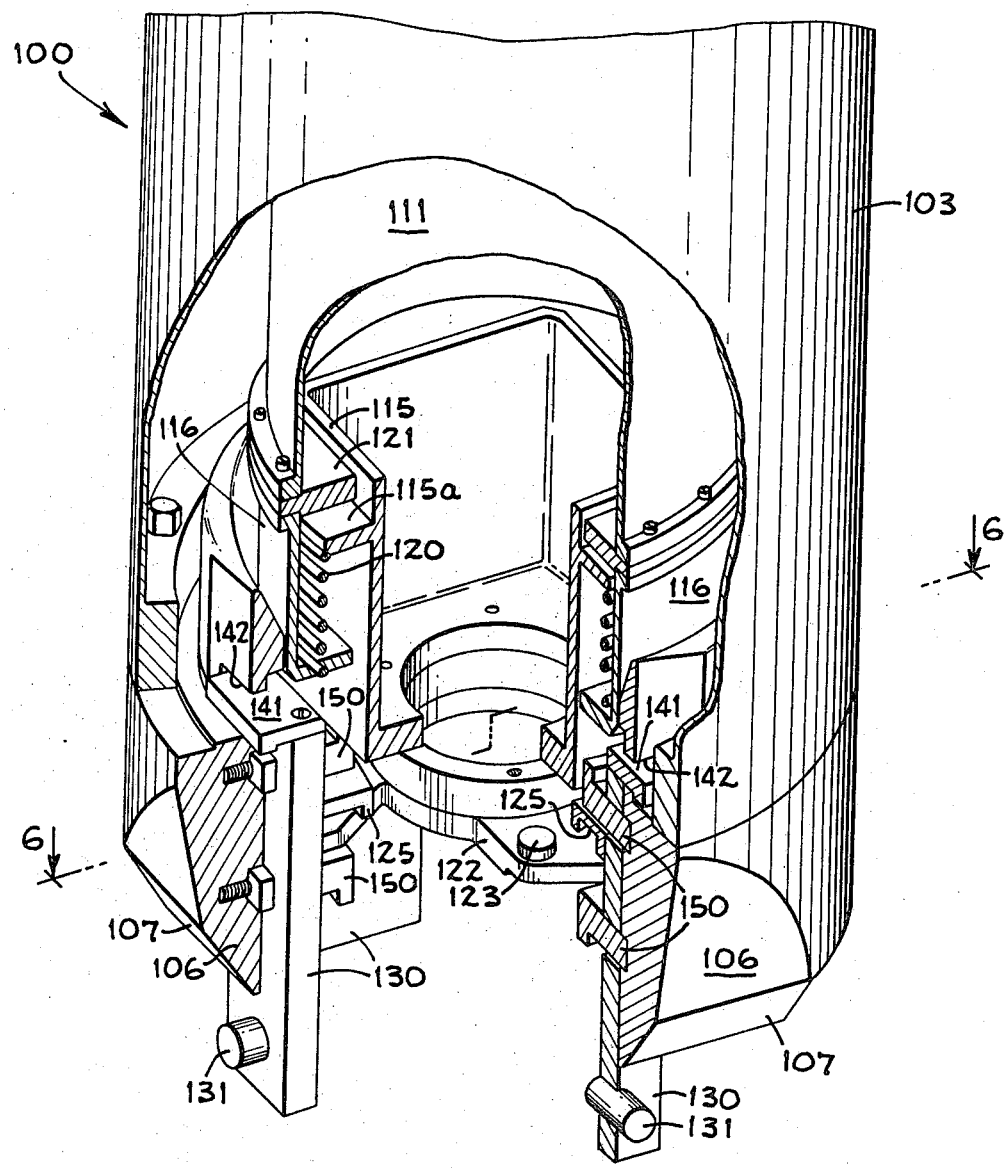

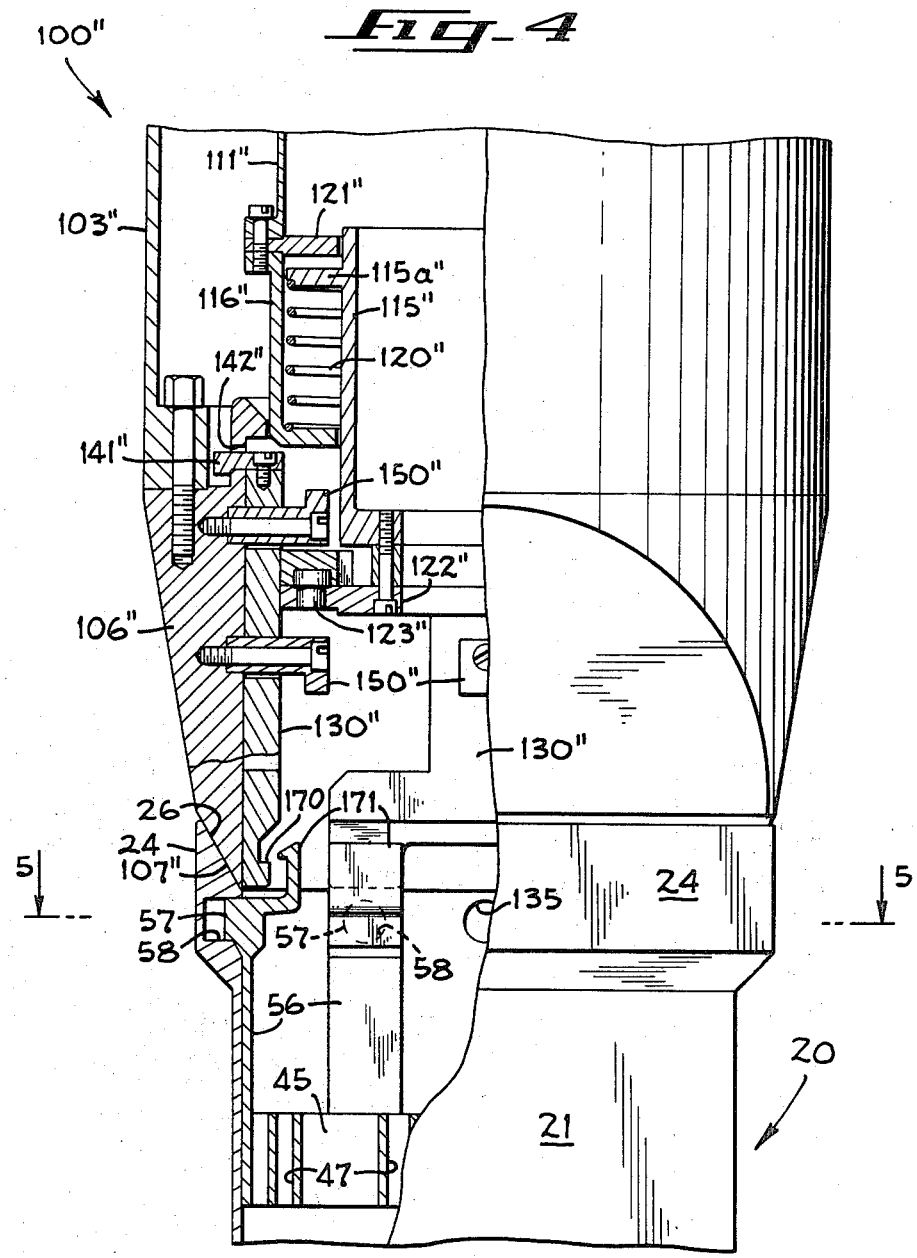

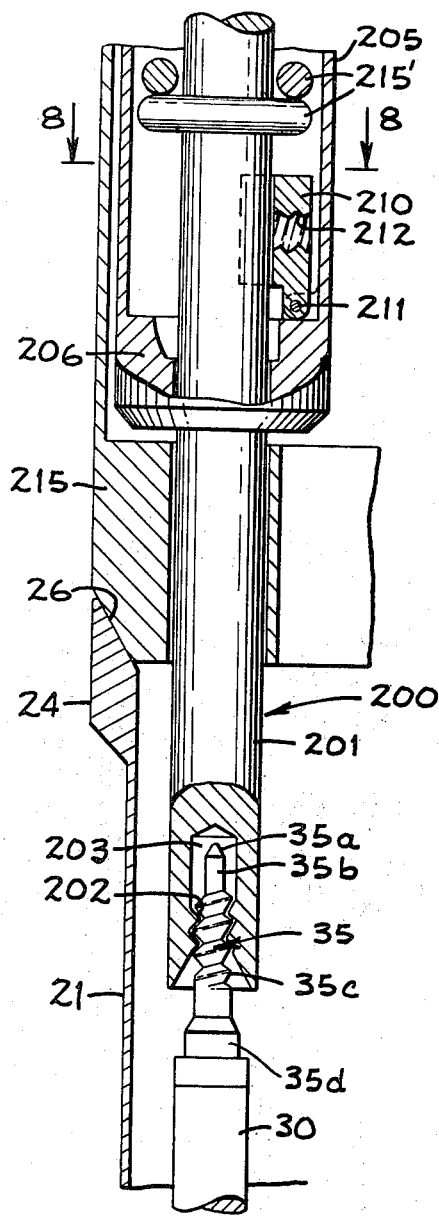
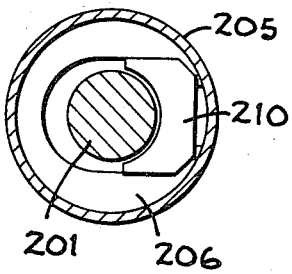
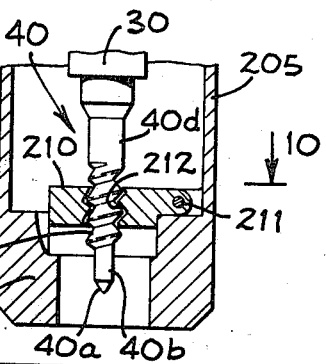
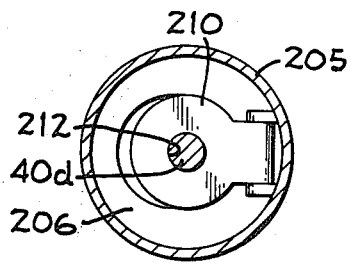

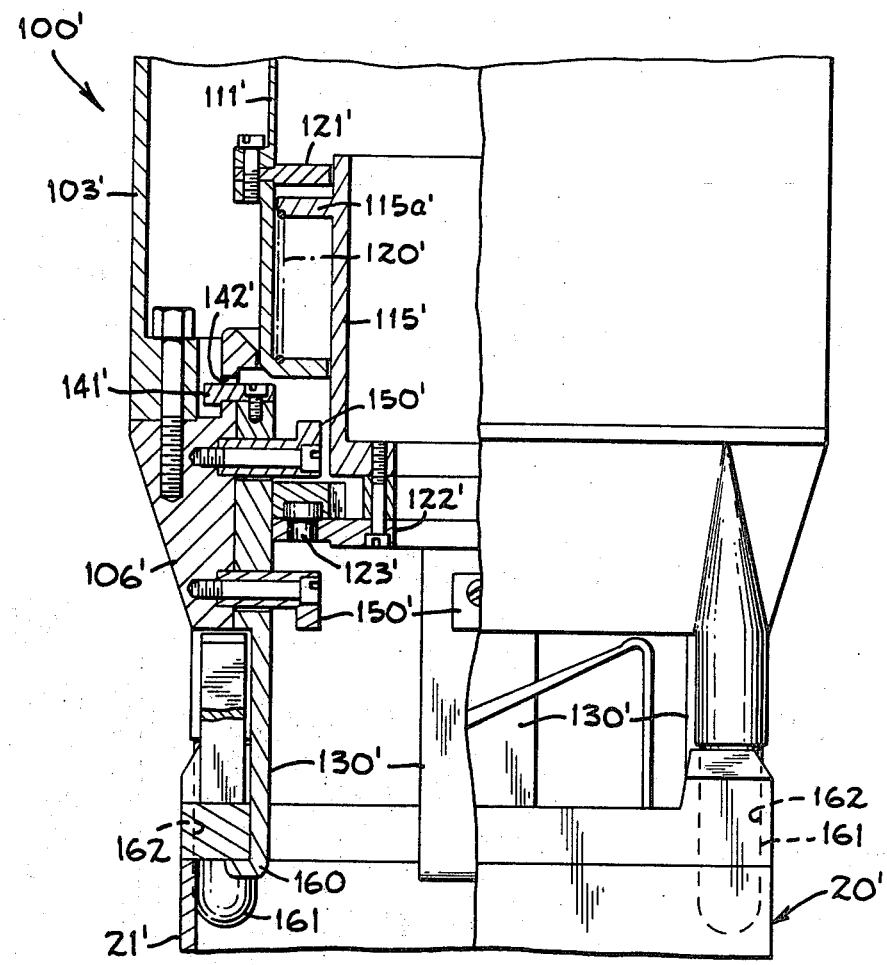

… … …

United States Patent Office 3,823,065
Patented July 9, 1974

3,823,065
APPARATUS FOR SELECTIVELY TRANSPORTING FUEL ELEMENTS
Cecil R. Jones, New Haven, Conn., assignor to Transfer Systems Incorporated, New York, N.Y.
Filed Sept. 7, 1971, Ser. No. 178,175
Int. Cl. G21c
U.S. Cl. 176—39                                  7 Claims

ABSTRACT OF THE DISCLOSURE

A nuclear fuel assembly in which vertically disposed fuel elements are spaced within a housing generally of a rectanguloid configuration. Each fuel element includes an upper end plug and lower end plug. Vertically spaced support plates are disposed in the housing with suitable openings to receive the upper and lower end plugs of the fuel elements for supporting the fuel elements with the housing. The upper plate is removable from the housing and the lower plug is detachably connected to the lower plate. A grapple having lifting plates with pins enter recesses formed in the housing for enabling the housing to be raised. After the fuel assembly is raised by the grapple, leaf spring retainers of the upper plate are dislodged for removing the upper plate from the housing. Now, the fuel elements can be removed selectively and individually from the fuel assembly by a removal tool. Aligned with and disposed above the removal tool is a transfer casing for housing the selectively removal fuel element while the selectively removed fuel element is transported to and from a fuel reprocessor.

BACKGROUND OF THE INVENTION

Heretofore, fuel assemblies with defective fuel elements were transported from a reactor power plant to a fuel reprocessor as a unit and returned as a unit from the fuel reprocessor to the reactor power plant. This procedure was unsatisfactoy because of the tendency of transported shipping casks containing the reactor fuel assembly to overheat from the loss of coolant during shipment. As a consequence thereof, the fuel elements would overheat to cause cladding failure and thereby release radioactive material to the coolant.

Coolant, such as water, flows among the fuel elements within a reactor power plant over prescribed paths. The housing for the assembly of fuel elements has generally been square. The fuel elements disposed therein present aligned surfaces to the walls of the housing, which causes a pressure drop from the inside of the housing to the outside of the housing. The rate of flow of coolant among the fuel elements in the housing is restricted by the pressure differential of the coolant across the housing. Heretofore, mechanical equipment was employed in the housing to retain and center the fuel elements which caused an increase in the pressure differential across the housing, thereby resulting in additional pressure drops in the flow of coolant across the housing.

In addition thereto, the efficiency of the use of the nuclear fuel is related to the homogeniety potential of the core of the reactor and the ability to change the core configuration. The core configuration is changed by the replacement of the fuel elements and the repositioning of the fuel elements. The efficiency of the use of the nuclear fuel is also related to the ability to keep contaminants from accumulating or being present on the hot surface of the fuel elements. The accumulation of contaminants on the hot surface of the fuel elements reduces the coefficient of heat transfer, increases the operating temperatures of the fuel cladding, and tends to reduce the life of the fuel elements.

Patents of interest are:

| No. 3,382,153 | No. 3,533,911 |
| No. 3,379,617 | No. 3,551,289 |
| No. 3,356,587 | No. 3,350,275 |
| No. 3,378,458 | No. 3,431,170 |
| No. 3,338,791 | |

SUMMARY OF THE INVENTION

A fuel assembly comprising a plurality of spaced, vertically disposed fuel elements within a housing and in which each of the fuel elements includes a threaded plug on each end thereof. Horizontally disposed, vertically spaced mounting plates in the housing receive the upper plugs and lower plugs, respectively, for removably supporting the fuel elements individually, whereby the fuel elements are selectively and respectively removed and installed. The upper mounting plate is detachably supported by the housing.

By virtue of this arrangement, all the fuel elements are similar in construction for standardization so that they can occupy any vertical position in the fuel assembly. Further, each fuel element is constructed to be individually removed, cleaned, inspected, measured for power distribution and isotopic concentration, replaced or returned to the reactor core for improved efficiency of the use of the nuclear fuel. The removal and replacement of the respective fuel elements is accomplished by a threaded tool. Thus, the fuel elements can be handled separate and apart from the fuel assembly for fabrication, radiation measurements, shipping, handling and processing.

The housing for the fuel assembly is formed with recesses that are received by pins of a grapple for raising the fuel assembly. A grapple tool serves to engage the resiliently mounted upper mounting plate in the housing for removing the same. Thus, the increase in pressure drop of the coolant flow across the housing is not increased by the presence of mechanical equipment in the housing for retaining and centering the fuel elements.

By being able to remove fuel elements individually from the fuel assembly for shipment to a fuel processor, only the defective fuel elements are transported. Each fuel element is disposed within an individual case for shipment. Hence, the shipment of radioactive parts from the site of the reactor power plant is kept at a minimum. Also, the tendency for the fuel element to melt during shipment is reduced because the fuel element confronts a cold transfer case and not another fuel element. Thus, the radioactive area has been reduced and the capacity to withstand heat has been increased. By attaching the spacer plates to the inner walls of the housing, the structural rigidity of the assembly is enhanced. Noteworthy is the fact that the load is carried by the housing and not by the fuel elements.

DESCRIPTION OF THE DRAWINGS

FIG. 1 is a perspective view of a fuel assembly for a nuclear power plant embodying the present invention, illustrated in conjunction with a portion of the lifting grapple.

FIG. 2 is a vertical section view of the fuel assembly shown in FIG. 1 taken along line 2—2 of FIG. 1.

FIG. 3 is a fragmentary perspective view of the movable portion of a lifting grapple for raising and lowering the fuel assembly shown in FIGS. 1 and 2.

FIG. 4 is a fragmentary diagrammatic front elevation view partially in section of a lifting grapple for removing an upper detachable spacer plate in the housing which supports the upper portion of the fuel elements.

FIG. 5 is a horizontal sectional view taken along line 5—5 of FIG. 4 to illustrate the removable upper spacer member for removably retaining the fuel elements in the fuel assembly.

FIG. 6 is a horizontal section view taken along line 6—6 of FIG. 3 to illustrate the arrangement for actuating the assembly lifting apparatus into and out of engagement with the fuel assembly.

FIG. 7 is a diagrammatic longitudinal sectional view of a threaded tool and transport device for removing and transferring a fuel element shown in conjunction with a fragmentary view of the fuel assembly and fuel element.

FIG. 8 is a horizontal sectional view taken along lines 8—8 of FIG. 7 of the threaded removal tool and fuel element transport device shown in FIG. 7.

FIG. 9 is a fragmentary longitudinal section of the fuel element transfer device shown in a latch position.

FIG. 10 is a plan horizontal sectional view of the transfer device shown in FIG. 7 taken along line 10—10 of FIG. 9.

FIG. 12 is a diagrammatic fragmentary elevation view partially in section of a modification of the assembly lifting device.

DETAILED DESCRIPTION OF THE PREFERRED EMBODIMENTS

Figure 11:
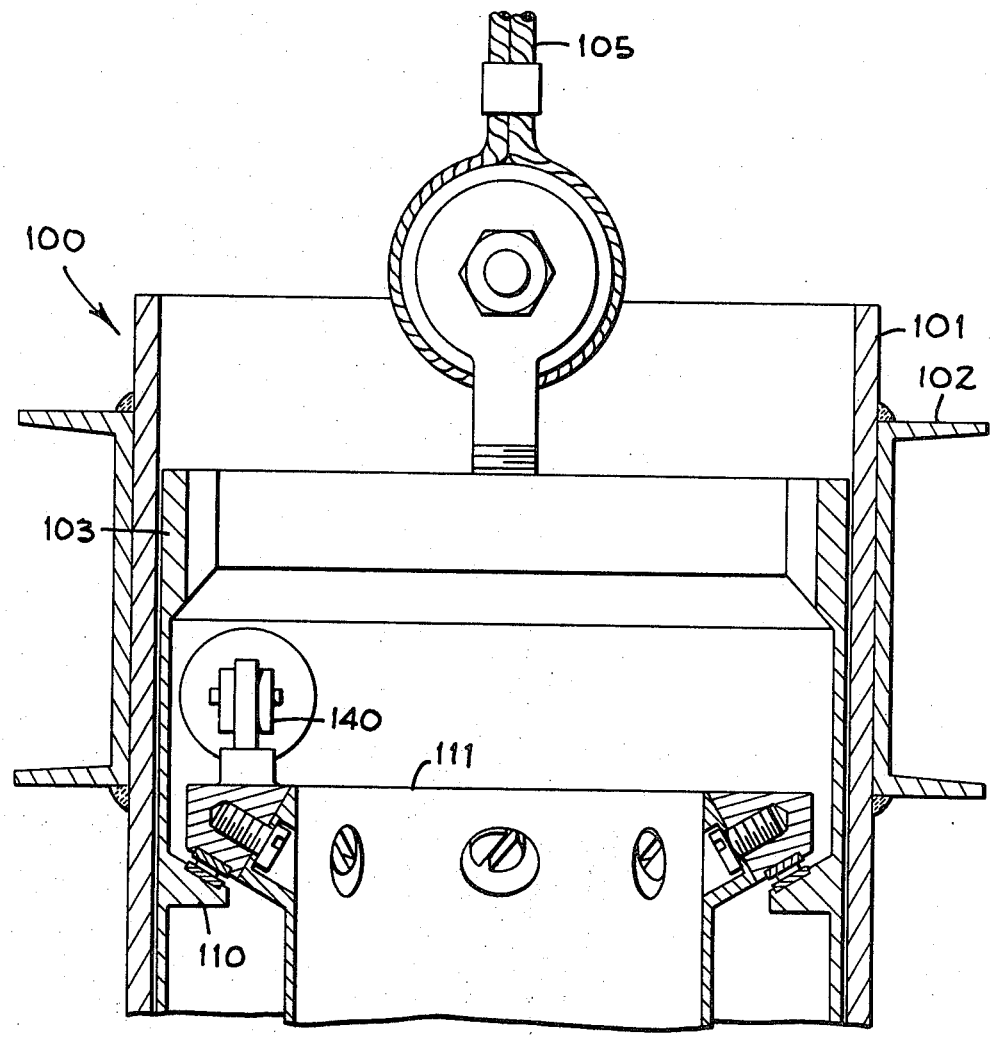
FIG. 11 is a diagrammatic sectional view of the upper portion of the fuel assembly lifting device illustrated with a hoist cable and refueling platform guide.

Illustrated in FIGS. 1 and 2 is the nuclear fuel assembly 20 of the present invention which comprises a housing or channel 21 having a generally square cross-sectional area. The lower end of the housing 23 has a generally round configuration. The lower end of the housing 23 is fixed to the upper end of the housing as a unitary structure by welding or the like. The upper end of the housing is open and comprises downwardly directed walls 24. The walls 24 have downwardly and inwardly directed surfaces 26 (FIGS. 1, 2 and 4). The configuration of the upper end of the housing 21 is shaped to guide a grapple to be described hereinafter to its proper grappling position relative to the housing 21.

Disposed within the housing 21 is an array of elongated, parallel, spaced fuel elements 30 (FIG. 2) of suitable fissionable material. The fuel elements are also referred to as fuel pins and made of zirconium or a zirconium alloy. The fuel elements 30 are vertically disposed within the housing 21. Coolant flows within the housing 21 among the spaced fuel elements 30 and also within the nuclear fuel core among a plurality of spaced fuel assemblies 20.

At the upper end of each fuel element 30 is fixed an upper mounting plug 35 which seals off the upper end of the associated fuel element 30. Each of the mounting plugs 35 is formed with a generally conical tip 35a which continues into a cylindrical portion 35b and terminates in a cylindrical configuration. A wide thread, threaded section 35c of the mounting plug 35 terminates at a cylindrical portion 35d. The threaded section 35 comprises a series of adjacent frusta conical surfaces. Fixed to the lower end of each fuel element is a lower mounting plug 40, which is similar in construction to the upper mounting plug 35. Each of the lower mounting plugs 40 is formed with a conical end portion 40a which continues into a cylindrical section 40b. The cylindrical section 40b of the mounting plug 40 joins a wide thread, threaded section 40c. The threaded section 40c comprises a series of adjacent frusta conical surfaces which terminates in a cylindrical portion 40d. In a manner to be described hereinafter, a threaded tool (FIG. 7) grips in threaded engagement the upper plug 35 for removing, transferring and installing a fuel element, and a latch (FIG. 10) grips in threaded engagement the lower mounting plug 40 for retaining the fuel element in a casing for shipment to the refueling processor.

For supporting the fuel elements 30 within the housing 21, are a plurality of horizontally disposed, vertically spaced mounting plates or spacers 45 and 46 (FIGS. 2 and 5). The upper mounting plate 45 (FIG. 5) is formed with a plurality of parallel rows of openings 47. There is one opening 47 for each fuel element 30. Each upper plug 35 is received by its associated opening 47. The upper mounting plate 45 is detachably secured to the walls of the housing 21 and is displaceable relative to the housing 21. For this purpose, leaf spring arms 56 are fixed at one end thereof to the mounting plate 45 (FIGS. 2 and 5) and at the distal end thereof include a cylindrical pad or projection 57 that seats in recesses 58, respectively. The recesses 58 are formed in the walls 24 of the housing 21 but do not extend therethrough. By urging the projections 57 into the housing 21 a sufficient distance to clear the walls 24 of the housing 21, a grapple tool (FIG. 4) to be described in detail hereinafter can be employed to remove the mounting plate 45 from the housing 21 by raising the same through the upper end of the housing 21.

The lower mounting plate 46 is formed with a plurality of parallel rows of openings 55 and is generally similar in appearance to the upper spacer 45 (FIG. 5). There is one opening 55 for each fuel element 30. Each lower plug 40 is received by its associated opening 55. The lower mounting plate 46 is fixed to the housing 21 by suitable means, such as welding, brazing or the like.

For maintaining each fuel element 30 relatively stable relative to the spacers 45 and 46, each upper plug 35 is surrounded by a helical spring 59 (FIG. 2) that is anchored to the lower end of the removable spacer 45 so as to surround the opening 47 associated therewith. The spring 59 urges its associated fuel element 30 to be stable in its prescribed position. In the alternative, the lower plugs 40 of the fuel elements 30 may be detachably held by the mounting plate 46 through the yieldable action of an associated plunger spring, not shown, and the confronting wall of the mounting plate, which defines a groove, not shown, for receiving the associated spring loaded detent.

Intermediate the upper mounting plate 45 and the lower mounting plate 46 is at least one centering plate 60. The centering plate 60 is formed with a plurality of parallel rows of openings 61. There is one opening 61 for each fuel element 30. Each fuel element 30 is received by its associated opening 61. The centering plate 61 is fixed to the walls of the housing 21 by means of welding, brazing, or the like, and is similar in construction to the spacer 46.

For raising and lowering the fuel assembly 20 within a reactor vessel, not shown, and more particularly within the fuel core thereof, not shown, to selectively and individually remove fuel elements 30 from the housing 21, an assembly lifting apparatus or grapple 100 embodying the present invention is illustrated in FIGS. 3, 6 and 11.

The assembly gripping apparatus 100 is disposed within a cylindrical guide tube 101 (FIG. 11) that is fixed to a beam 102 of a well-known and conventional refueling platform superstructure. The assembly gripping apparatus 100 comprises a lifting cylindrical tube 103 (FIGS. 3 and 11) which is raised and lowered by a conventional hoist supported by the refueling platform superstructure. For this purpose, a cable 105 (FIG. 11) is clamped to the lifting tube 103 in a conventional manner. Fixed to the lower portion of the lifting tube 103 is a seating guide 106 (FIG. 3) of a quadrature configuration with inwardly tapered walls 107 to mate with the inner tapered surfaces 26 of the walls 24 of the assembly housing 21 to seat and guide the assembly gripping apparatus 100 relative to the fuel assembly 20 to be raised.

Formed on the inner wall of the lifting tube 103 is a flange 110 (FIG. 11). Supported for rotary movement by the flange 110 is a cylindrical actuating tube 111 (FIGS. 3 and 11) which extends downwardly within the lifting tube 103. Fixed to the lower end of the actuating tube 111 for rotation therewith is a cylindrical housing 116 (FIG. 3). Disposed within the actuating tube 111 is a rotatable quadrature member 115. Interposed between a flange 115a of the quadrature member 115 and the bottom wall of the housing 116 is a coil spring 120. Thus, the quadrature member 115 is yieldably supported by the coil spring 120 within the actuating tube 111 and the raising and lowering of the actuating tube 111 moves the quadrature member 115 therewith.

Projecting inwardly from the actuating tube 111 is a quadrature flange 121, which surrounds the quadrature member 115. Rotation of the actuating tube 111 imparts rotation to the quadrature member 115 through the flange 121. Depending from the quadrature member 115 for rotation therewith is a cam 122 (FIGS. 3 and 6). A plurality of cam pins 123 (FIG. 6), such as four, are supported by the cam 122 for rotation therewith. A plurality of cam followers 125 (FIGS. 3 and 6) receive the pins 123, respectively, and are moved thereby in a horizontal plane in response to the rotation of the cam 122.

Fixed to the cam followers 125, respectively, for movement therewith are a plurality of vertically disposed lifting plates or fingers 130. There are four lifting plates or fingers 130 in the preferred embodiment, with two pairs of confronting, parallel plates or fingers 130. By rotating the quadrature member 115, the cam followers 125 move in a horizontal plane to move confronting parallel lifting plates or fingers 130 toward or away from one another.

At the lower end of the lifting plates 130 are outwardly projecting pins 131, respectively. The pins 131 are horizontally disposed pins and are adapted to be received by recesses 135 (FIGS. 1, 2 and 5) formed in the opposing walls of the housing 21. To raise the fuel assembly 20, the cable 105 lowers the lifting tube 103 into the guide tube 101 until the tapered walls 107 (FIG. 4) of the seating guide 106 mate with the tapered surfaces 26 of the wall 24 of the fuel assembly housing 21. At this time, the lifting plates 130 are disposed inwardly or toward the center to reduce the space therebetween. An hydraulic linkage 140 (FIG. 11) on the actuator tube 103 rotates the actuator tube 103 about its axis. This action serves to rotate the quadrature member 115 causing the cam 122 and the cam pins 123 to rotate therewith. Thereupon, the cam followers 125 and the lifting plates 130 move outwardly so that the pins 131 of the plates 130 enter the openings 135 of the fuel assembly housing 21 to grip the fuel assembly housing 21 for lifting the same.

At the upper end of the lifting plates 130 are safety locks, respectively (similar to the safety locks 141 of FIG. 4), which are received by openings formed in the seating guide 106 when the pins 131 of the lifting plates 130 enter the openings 135 of the fuel assembly housing 21 and the fuel assembly 20 is initially elevated.

When the fuel assembly housing 21 is returned to its position in the reactor core, rack or the like, the tapered wall 107 of the seating guide 106 is in flush engagement with the tapered wall 26 of the fuel assembly housing 21, since the weight of the fuel assembly 20 is removed from the lifting apparatus 100. At this time, the coil spring 120 raises the quadrature member 115 slightly to raise the lifting plates 130. This action enables the safety locks 141 to be removed from the openings 142 of the seating guide 106. The air cylinder hydraulic linkage 140 rotates the actuating tube 111 to rotate the quadrature member 115. Thereupon, the cam 122 and the cam pins 123 rotate to move the cam followers 125 inwardly. This results in the retraction of the lifting plates 130 to remove the pins 131 from the openings 135 and to remove the locks 141 from the openings 142. Stops 150 (FIGS. 3 and 6) fixed to the seating guide 106 limit the inward movement of the plates 130.

The fuel assembly 20 is supported through the following parts, pins 131, lifting plates 130, stops 150, seating guide 106, lifting tube 103, and the hoist cable 105. Once the fuel assembly 20 is lifted and the load thereof is applied to the lifting plates 130, the actuating tube 111 is isolated from the load and the cam 122 is prevented from rotating, since the lifting plates 130 and the cam followers 125 are inhibited by the locks 141 for movement. Inadvertent actuation of the lifting apparatus 100 will not release the fuel asesmbly 20 once it is gripped. It is of interest to note that an operator can press down on tube 115 and rotate the same to dislodge the cam 122. Thereupon, the cam 122, the pin 123, the housing 115, the spring 120 and the housing 111 can be removed vertically from the lifting tube 103. In case of undesired locking of the grapple 100, a tool can be inserted into the cavity to pry the lifting plates 130 away from the recess 135 in the housing 21 to get access to the reactor core.

Illustrated in FIG. 12 is a fuel assembly lifting apparatus 100', which is a modification of the fuel assembly lifting apparatus 100. The parts of the lifting apparatus 100 that are similar in construction and operation to the parts of the lifting apparatus 100 have been designated with the same reference numeral and accompanied by a prime suffix.

In the fuel assembly lifting apparatus 100', the lifting plates 130' have hooks 160 at the distal ends thereof to engage an inwardly projecting flange in the fuel assembly housing 20' in lieu of pins received by openings in the housing 20'. Also, guide legs 161 extending downwardly from the guide seat 106' are received by vertical disposed openings 162 formed in the assembly housing 21' to guide the apparatus 100' into proper seating relation relative to the fuel asembly housing 20'.

Illustrated in FIG. 4 is a grapple 100" for removing the spacer plate 45 from the fuel assembly housing 21. The grapple 100" is similar to the grapple 100 in construction and operation with the exception that hooks 170 are mounted on the lifting plates 130 in lieu of the projections 131. Hence, parts of the grapple 100" corresponding with the parts of the grapple 100 are shown with the same reference numeral but with a double prime suffix. The upper space plate 45 is found with hooks 171 (FIGS. 2 and 4) on the leaf springs 56 that mate with the hooks 170 of the grapple 100". More specifically, the distal ends of each of the leaf springs 56 includes the hook 171 that is directed in a direction opposite from the direction in which the associated projection 57 is directed.

When the lifting plates 130" are retracted inwardly by the cam followers 125", hooks 170 on the lifting plates 130 engage hooks 171 on the leaf springs 56 to remove the pins 57 from the recesses 58 to detachably remove the spacer 45 from the fuel assembly 20. The cable, such as the cable 105 in FIG. 11, raises the lifting tube 103" to lift the spacer 45 from the assembly 20 and the reactor core.

After the mounting plate 45 is removed from the housing 21, a tool 200 (FIGS. 7–10) grips the fuel element 30 selected to be removed individually and applies a lifting force thereto. Toward this end, the tool 200 comprises a shaft 201. The free end of the shaft 201 comprises a threaded wall 202 surrounding an opening 203. The threaded portion of the wall 202 has a configuration generally similar to the threaded section 35c of the plug 35 of a dimension sufficient to permit threaded engagement and yet large enough to compensate for expansions and the collection of foreign matter without causing unwanted locking. The upper plug 35 of the fuel element 30 to be removed enters the opening 203 so that the threaded wall 202 engages in threaded engagement the threaded portion 35c of the upper plug 35. Now, the shaft 201 of the removal tool 200 is raised vertically by a suitable hydraulic lift, not shown, conventionally mounted on the refueling platform for lifting equipment grapples.

At the outset of removing the fuel element 30 from the fuel assembly 20, the shaft 201 has its upper end above the upper end of a guide 215 and its lower end extending beyond the threaded portions 35c of the upper end plug 35. Above the guide 106 is disposed a cylindrical fuel casing 205 that has its axis aligned with the axis of the shaft 201. The length of the fuel casing 205 is sufficient to fully enclose the fuel element 30. Within the housing 205 is an annular flange 206 for guiding the movement of the shaft 201 within the housing 205 and to hold the fuel element 30 snugly within the fuel casing 205. Mounted on the flange 206 is a latch 210 that is pivoted about a pivot pin 211 and has a threaded opening 212. Above the latch 210 are suitable guides and retainers 215' for guiding the movement of the fuel element 30 in the housing 205 and for retaining in a fixed position the upper portion of the fuel element 30 while in the housing 205.

The shaft 201 is raised to remove the defective fuel element 30 from the fuel assembly 20. The shaft 201 continues to be lifted until the defective fuel element 30 is contained by the transfer casing 205. Initially, the latch 210 is raised to the vertical position (FIGS. 7 and 8) and the shaft 201 and the defective fuel element 30 is raised beyond the latch 210. Then the latch 210 is pivoted under the force of gravity to the horizontal position (FIGS. 9 and 10) and the lower end plug 40 of the defective fuel element 30 is secured by threaded engagement to the latch 210 in the housing 205. The upper end of the defective fuel element 30 is retained in the housing 205 by the guides 215'. The removal tool 200 is disengaged from the defective fuel element 30 when the defective fuel element 30 is encased in the casing 205. The defective fuel element 30 is shipped individually to and from the fuel reprocessor while encased in the transfer casing 205.

I claim:

1. Apparatus for transporting a nuclear reactor fuel element having plug ends, comprising a housing for accommodating the fuel element, means within said housing for holding said fuel element in said housing, latching means at a lower portion of said housing, said latching means comprising a member having an opening for receiving the fuel element lower plug end for holding the lower part of said fuel element, and means for pivotably mounting said latching member within the housing whereby said latching member can occupy a first position enabling passage of the fuel element past the latching member and into the housing and a second position wherein said latching member extends across the housing for its opening to be engaged by the fuel element lower end plug.

2. Apparatus as claimed in claim 1 wherein the lower end plug of the fuel element is threaded, and the latching member opening is threaded for threadingly engaging the threaded lower end plug of the fuel element.

3. Apparatus as claimed in claim 1 and further including guide and retainer means for retaining within the housing an upper portion of the fuel element.

4. Apparatus as claimed in claim 1 and further including a removal tool for said fuel element, said removal tool being disposable within and extendible through said housing.

5. Apparatus as claimed in claim 4 wherein the upper plug end of the fuel element is threaded, the removal tool comprises a vertically movable and rotable shaft with a threaded opening at its lower end for threadingly engaging the threaded upper end plug of the fuel element for lifting the fuel element into the housing.

6. Apparatus as claimed in claim 5 wherein the lower end plug of the fuel element is threaded, and the housing comprises a pivotable latch at its lower portion with a threaded opening in said latch for receiving the threaded lower end plug of the fuel element for retaining the fuel element within the housing.

7. Apparatus as claimed in claim 6 and further including guide means on the housing for guiding vertical movement of the removal tool shaft through said housing.

References Cited

UNITED STATES PATENTS

| 3,179,243 | 4/1965 | Ashcroft | 250—507 X |
| 3,284,315 | 11/1966 | Thome | 176—87 X |
| 2,775,341 | 12/1956 | Williams | 206—16 R |
| 2,415,589 | 2/1947 | Hahn | 206—16 R |
| 2,690,947 | 10/1954 | Roehrl | 206—16 R |
| 350,016 | 9/1886 | Richards | 206—17 |
| 2,595,230 | 5/1952 | Daviao | 206—16 R |
| 2,399,869 | 5/1946 | Hough | 206—16 R |

FOREIGN PATENTS

| 644,021 | 7/1962 | Canada | 176—30 |

CARL D. QUARFORTH, Primary Examiner

R. S. GAITHER, Assistant Examiner

U.S. Cl. X.R.

176—28, 87, 79; 250—506, 507